(12) United States Patent
Wheeler et al.

(10) Patent No.: US 11,340,082 B2
(45) Date of Patent: May 24, 2022

(54) DETERMINING LOCALIZATION CONFIDENCE OF VEHICLES BASED ON CONVERGENCE RANGES

(71) Applicant: DeepMap Inc., Palo Alto, CA (US)

(72) Inventors: Mark Wheeler, Saratoga, CA (US); Derik Schroeter, Fremont, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 34 days.

(21) Appl. No.: 16/919,150

(22) Filed: Jul. 2, 2020

(65) Prior Publication Data

US 2021/0003403 A1 Jan. 7, 2021

Related U.S. Application Data

(60) Provisional application No. 62/869,951, filed on Jul. 2, 2019.

(51) Int. Cl.
*G01C 21/32* (2006.01)
*G01C 21/36* (2006.01)
(Continued)

(52) U.S. Cl.
CPC ........... *G01C 21/32* (2013.01); *B60W 60/001* (2020.02); *G01C 21/30* (2013.01);
(Continued)

(58) Field of Classification Search
CPC .... G01C 21/32; G01C 21/30; G01C 21/3605; G06F 16/29; B60W 60/001;
(Continued)

(56) References Cited

FOREIGN PATENT DOCUMENTS

WO WO-2018126083 A1 * 7/2018 ............. G01C 11/30
WO WO-2019109082 A1 * 6/2019 ............ G05D 1/0274

OTHER PUBLICATIONS

U.S. Appl. No. 16/919,141, filed Jul. 2, 2020, titled "Using Measure of Constrainedness in High Definition Maps for Localization of Vehicles".

(Continued)

*Primary Examiner* — Rami Khatib
*Assistant Examiner* — Shahira Baajour
(74) *Attorney, Agent, or Firm* — Maschoff Brennan

(57) ABSTRACT

According to an aspect of an embodiment, operations may comprise for each of the set of geographic X-positions, accessing an HD map of a geographical region surrounding the geographic X-position, determining a convergence range for the geographic X-position, and storing the convergence range for the geographic X-position in the HD map. The operations may also comprise accessing the HD map, predicting a next geographic X-position of a target vehicle, predicting a covariance of the predicted next geographic X-position, accessing the convergence range for the geographic X-position in the HD map closest to the predicted next geographic X-position, estimating a current geographic X-position of the target vehicle by performing a localization algorithm, and determining a confidence value for the estimated current geographic X-position of the target vehicle based on the predicted next geographic X-position, the predicted covariance, and the accessed convergence range.

18 Claims, 13 Drawing Sheets

(51) Int. Cl.
　　*G06F 16/29*　　(2019.01)
　　*B60W 60/00*　　(2020.01)
　　*G01C 21/30*　　(2006.01)
　　*G06V 20/56*　　(2022.01)
　　*G05D 1/00*　　(2006.01)
　　*G05D 1/02*　　(2020.01)

(52) U.S. Cl.
　　CPC .......... *G01C 21/3605* (2013.01); *G06F 16/29* (2019.01); *G06V 20/56* (2022.01); *B60W 60/0025* (2020.02); *B60W 2420/52* (2013.01); *G05D 1/0088* (2013.01); *G05D 1/0274* (2013.01); *G05D 2201/0213* (2013.01)

(58) Field of Classification Search
　　CPC .......... B60W 60/0025; B60W 2420/52; G06K 9/00791; G05D 1/0088; G05D 1/0274; G05D 2201/0213
　　See application file for complete search history.

(56) References Cited

OTHER PUBLICATIONS

Natasha Gelfand, Leslie Ikemoto, Szymon Rusinkiewicz, Marc Levoy; "Geometrically Stable Sampling for the ICP Algorithm"; International Conference on 3D Digital Imaging and Modeling (3DIM); 2003; 8 pages.

Jean-Emmanuel Deschaud; "IMLS-SLAM: scan-to-model matching based on 3D data"; IEEE International Conference on Robotics and Automation (ICRA); 2018; 6 pages.

Silvere Bonnabel, Martin Barczyk and Francois Goulette; "On the Covariance of ICP-based Scan-Matching Techniques"; American Control Conference (ACC); 2016; 6 pages.

* cited by examiner

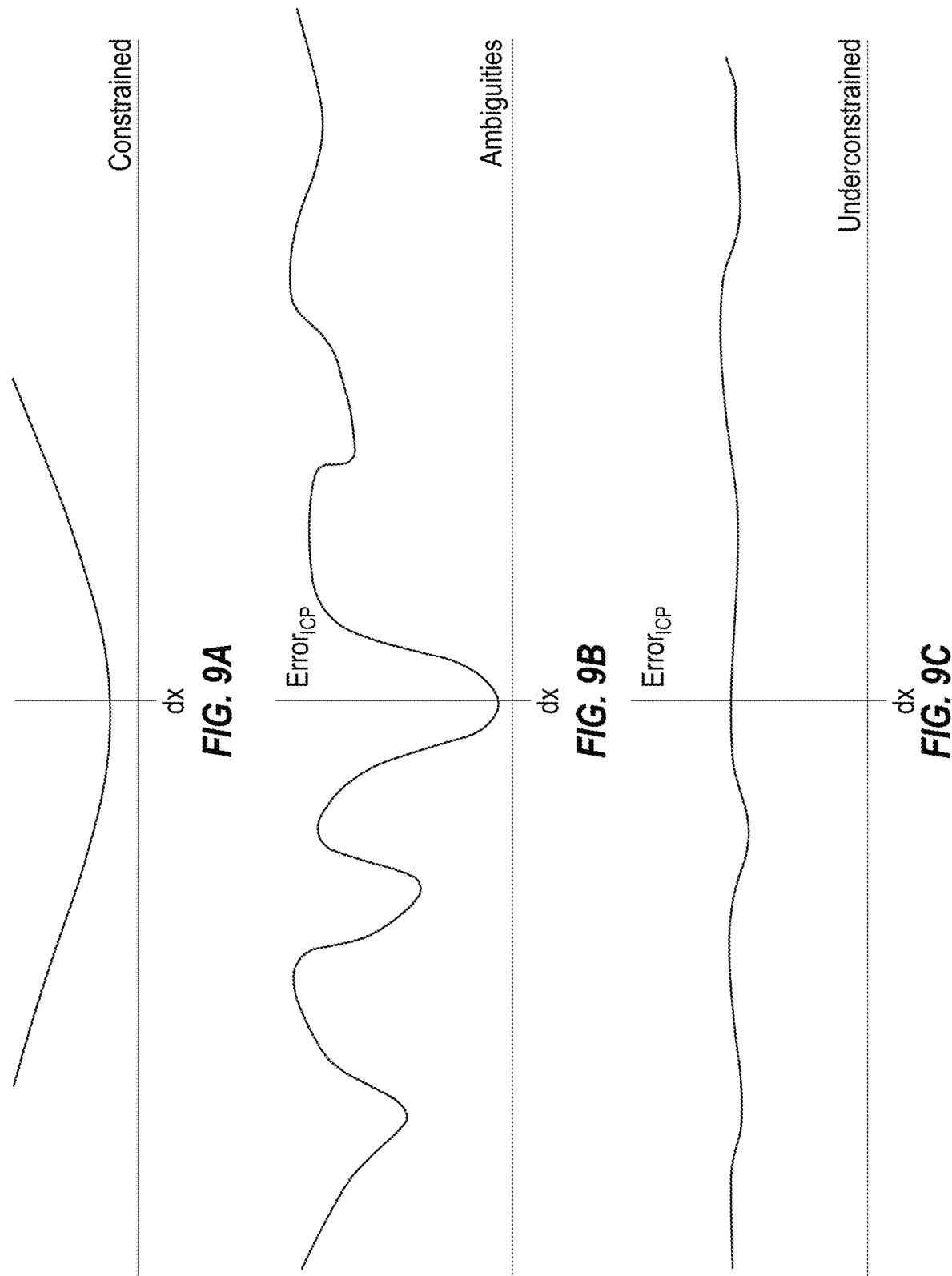

DETERMINING LOCALIZATION CONFIDENCE OF VEHICLES BASED ON CONVERGENCE RANGES

CROSS-REFERENCE TO A RELATED APPLICATION

This patent application claims the benefit of and priority to U.S. Provisional App. No. 62/869,951 filed Jul. 2, 2019, which is incorporated by reference in the present disclosure in its entirety for all that it discloses.

FIELD

The embodiments discussed herein are related to maps for autonomous vehicles, and more particularly to determining localization confidence of vehicles based on convergence ranges.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle safely in some instances. Vehicle sensors may be obscured by corners, rolling hills, other vehicles, etc. Vehicles sensors may not observe certain inputs early enough to make decisions that may be necessary to operate the vehicle safely or to reach a desired destination. In addition, some inputs, such as lanes, road signs, or traffic signals, may be missing on the road, may be obscured from view, or may not be readily visible, and therefore may not be detectable by sensors. Furthermore, vehicle sensors may have difficulty detecting emergency vehicles, a stopped obstacle in a given lane of traffic, or road signs for rights of way.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy that for navigation within a certain safety threshold (e.g., accuracy within 30 centimeters (cm) or better). Further, GPS systems may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given area. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may comprise accessing a set of geographic X-positions of one or more vehicles, and for each of the set of geographic X-positions: accessing a high definition (HD) map of a geographical region surrounding the geographic X-position with the HD map comprising a three-dimensional (3D) representation of the geographical region, determining a convergence range for the geographic X-position with the convergence range representing a range in which a localization algorithm converges to a true geographic X-position with a noisy initial guess in that range, and storing the convergence range for the geographic X-position in the HD map. The operations may also comprise accessing the HD map, predicting a next geographic X-position of a target vehicle, predicting a covariance of the predicted next geographic X-position, accessing the convergence range for the geographic X-position in the HD map closest to the predicted next geographic X-position, estimating a current geographic X-position of the target vehicle by performing a localization algorithm, and determining a confidence value for the estimated current geographic X-position of the target vehicle based on the predicted next geographic X-position, the predicted covariance, and the accessed convergence range.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 9A, 9B, 9C, 9D, 9E, 9F, and 9G illustrate various graphs related to determining a likelihood that a localization is correct;

DESCRIPTION OF EMBODIMENTS

Overview

Figure 1:
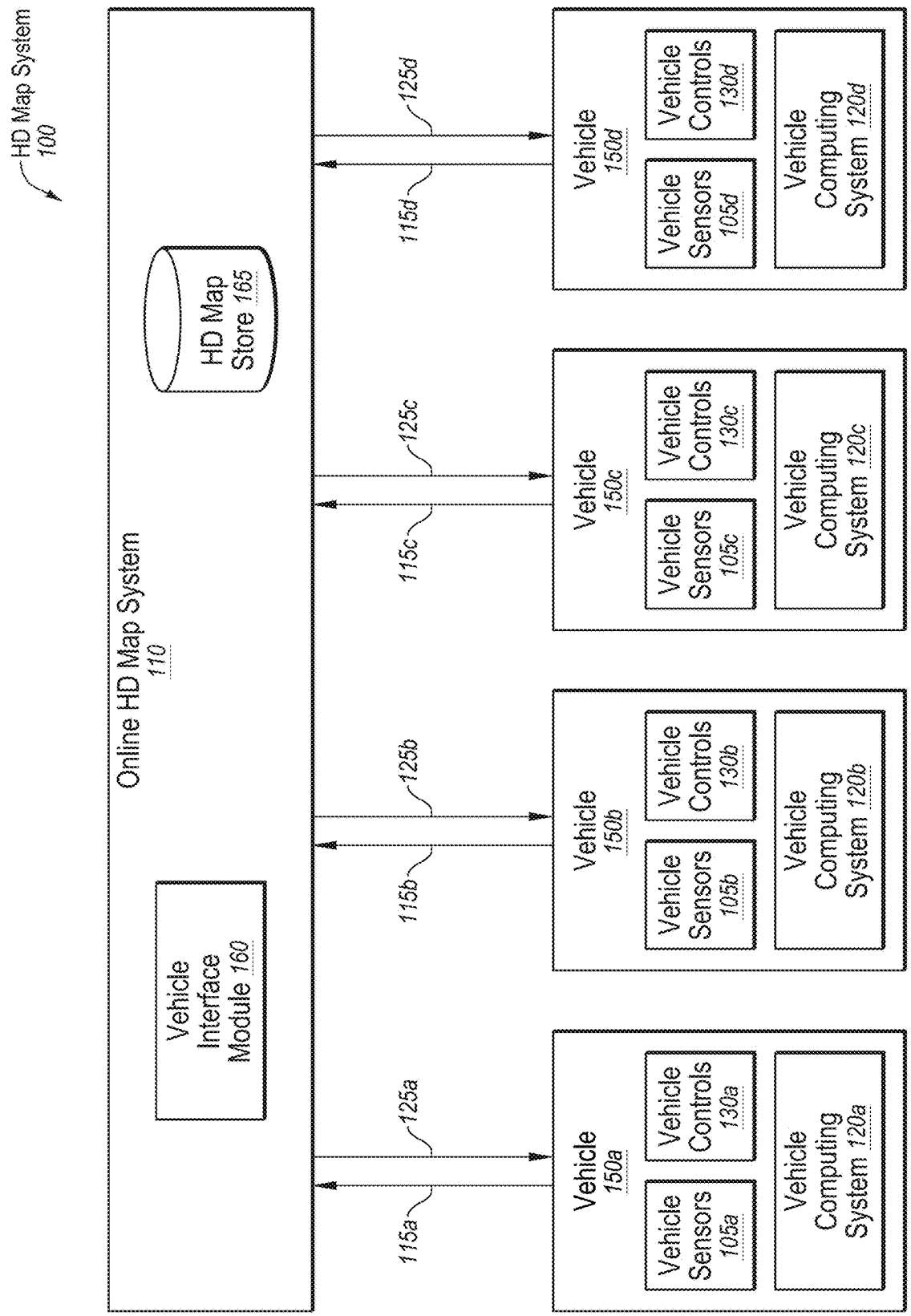
FIG. 1 illustrates an example overall system environment of an HD map system interacting with multiple vehicle computing systems.

Embodiments of the present disclosure may maintain high definition (HD) maps that may include up-to-date information with high accuracy or precision. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up-to-date, but up-to-date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

The autonomous vehicle may be a vehicle capable of sensing its environment and navigating without human input. An HD map may refer to a map that may store data with high precision and accuracy, for example, with accuracies of approximately 2-30 cm.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for the region. Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given geographic region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD Map.

Some embodiments of the present disclosure may enable determining localization confidence of vehicles based on convergence ranges. For example, when a vehicle begins navigation along a road, and at various other time during the navigation of the vehicle, a confidence value for an estimated current geographic X-position of a target vehicle (e.g., where the X-direction is the forward direction of the target vehicle) may be determined based on a predicted next geographic X-position of the target vehicle, the predicted covariance of the predicted next geographic X-position, and a convergence range for the estimated current geographic X-position. In some embodiments, the convergence range may indicate how well a vehicle pose can be constrained at a particular point within a geographical region. For example, if there are several 3D structures with distinct features that are observable from a vehicle location (e.g., in urban settings with plenty of distinct buildings and other structures), the vehicle location may be well constrained, and localization may be performed with high accuracy. Alternatively, if there are very few or no 3D structures with distinct features (e.g., in large parking lots, wide open areas, and along certain highway stretches), localization may not be performed with high accuracy in that geographical region. The convergence range may thus be used to determine a confidence value for localization, for example, when an autonomous vehicle is driving. Some embodiments disclosed herein may then use the localization of an autonomous vehicle for navigating the autonomous vehicle.

Embodiments of the present disclosure are explained with reference to the accompanying drawings.

System Environment of HD Map System

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150*a-d*) of the HD map system 100. The vehicles 150 may be autonomous vehicles or non-autonomous vehicles.

The online HD map system 110 may be configured to receive sensor data that may be captured by sensors of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120*a-d*) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
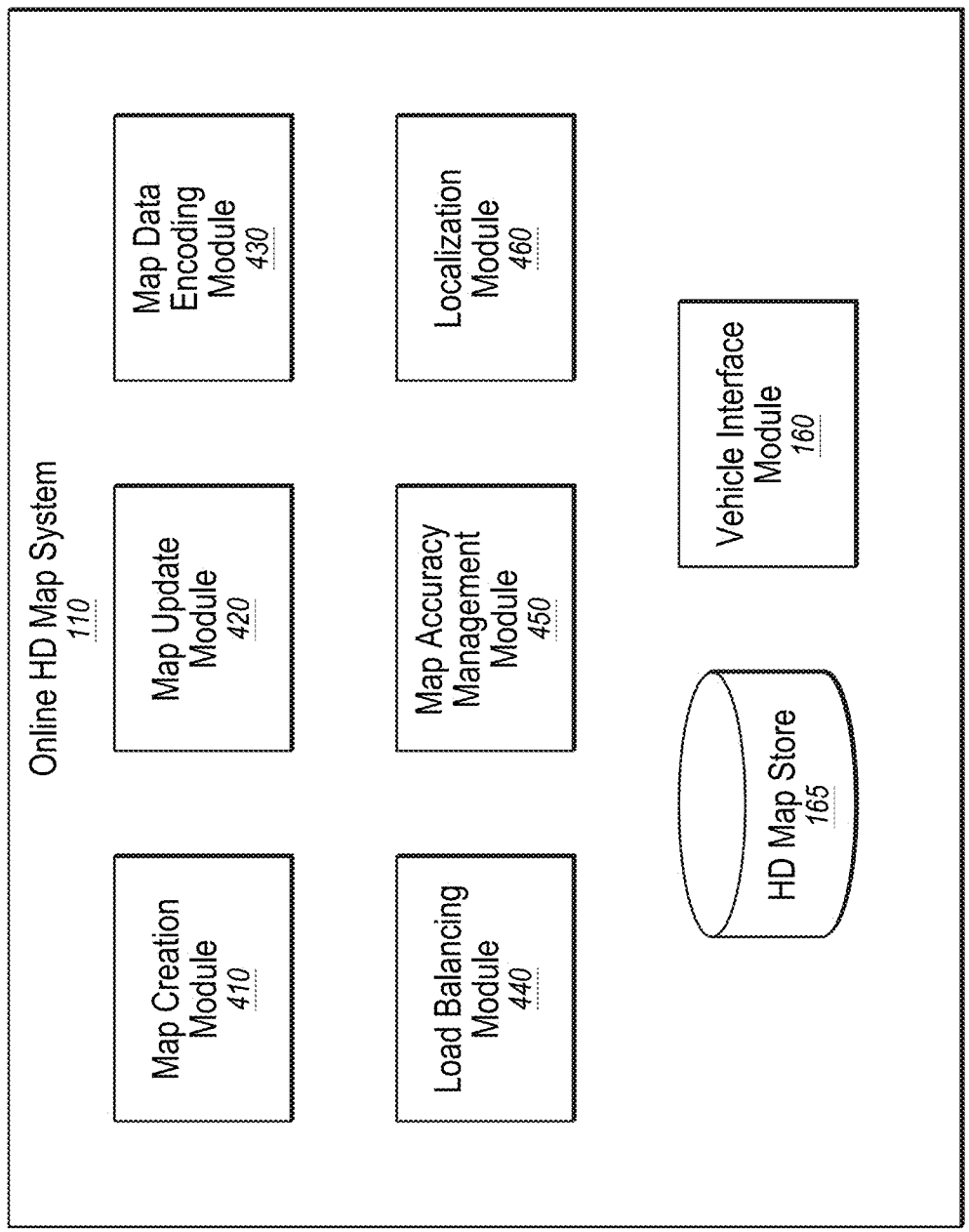
FIG. 4 illustrates an example of system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4 and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being traveled to the online HD map system 110. In response, the online HD map system 110 may be configured to provide HD map data of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105*a-d*), vehicle controls 130 (e.g., vehicle controls 130*a-d*), and a vehicle computing system 120 (e.g., vehicle computer systems 120*a-d*). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a light detection and ranging sensor (LIDAR), a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
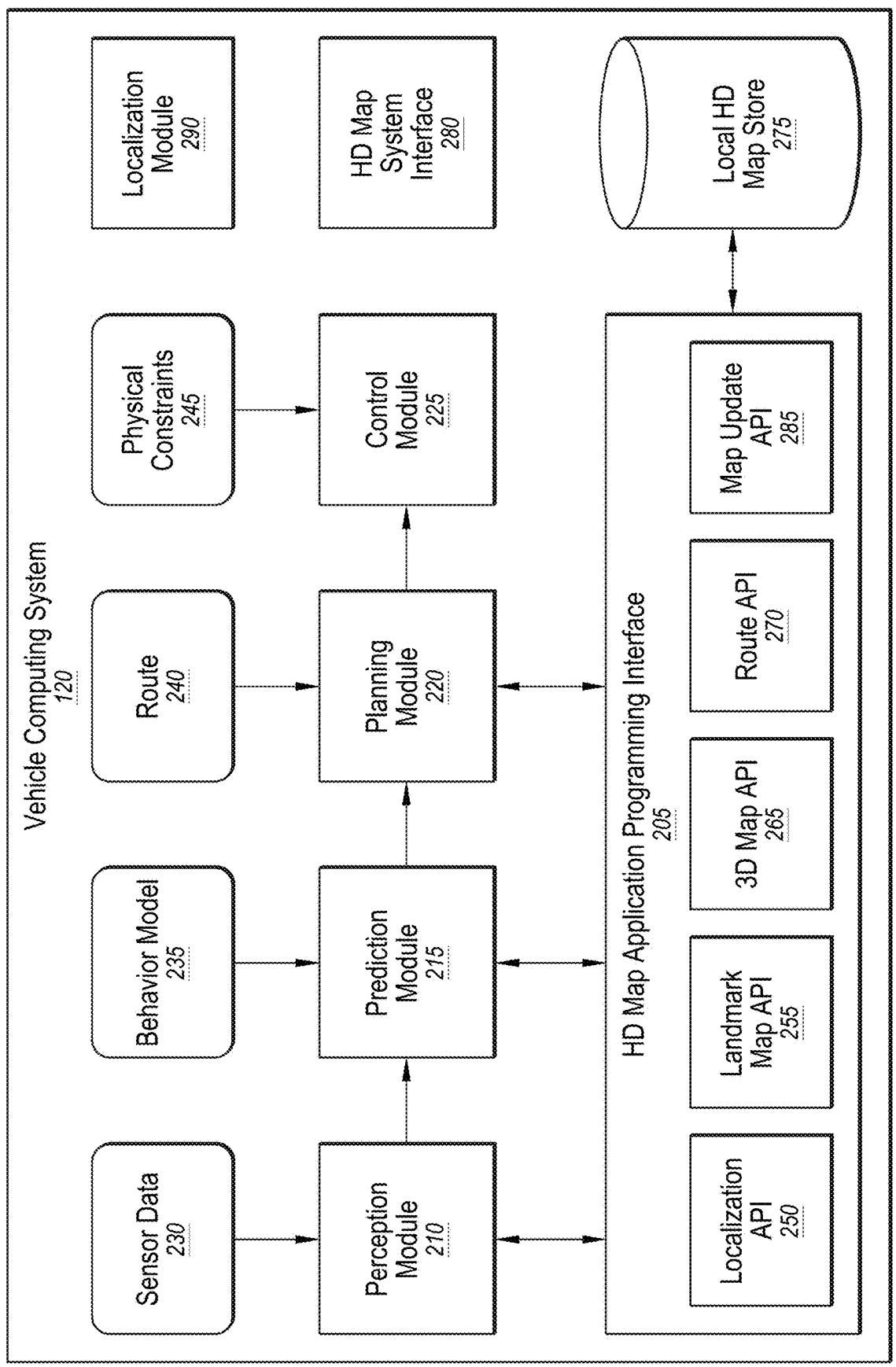
FIG. 2 illustrates an example system architecture of a vehicle computing system.

FIG. 2 illustrates an example system architecture of the vehicle computing system 120. The vehicle computing system 120 may include a perception module 210, a prediction module 215, a planning module 220, a control module 225, a localization module 290, a local HD map store 275, an HD map system interface 280, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 200 may be configured to receive information describing the surroundings of the corresponding vehicle 150 from the prediction module 215 and a route 240 that may indicate a destination of the vehicle 150 and that may indicate the path that the vehicle 150 may take to get to the destination.

The planning module 200 may also be configured to use the information from the prediction module 215 and the route 240 to plan a sequence of actions that the vehicle 150 may to take within a short time interval, for example, within the next few seconds. In some embodiments, the planning module 200 may be configured to specify a sequence of actions as one or more points representing nearby locations that the corresponding vehicle 150 may drive through next. The planning module 200 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 200. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send control signals to the vehicle controls 130 that may cause the corresponding vehicle 150 to execute the specified sequence of actions and may cause the corresponding vehicle 150 to move according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the map data using an HD map API 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD map system 110. The HD map API 205 may be configured to process the map data format as provided by the online HD map system 110. The HD map API 205 may be configured to provide the vehicle computing system 120 with an interface for interacting with the HD map data. The HD map API 205 may include several APIs including a localization API 250, a landmark map API 255, a 3D map API 265, a route API 270, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging within from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within a specified degree of accuracy) route specifying lanes based on the HD maps. The localize-route API may be configured to receive as input a route from a source to a destination via one or more third-party maps and may be configured to generate a high precision (e.g., within a specified degree of precision such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and return lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map APIs 265 may include a fetch-navigable-surfaces API and a fetch-occupancy-grid API. The fetch-navigable-surfaces API may be configured to receive as input identifiers for one or more lane elements and return navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location. The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to detect obstacles and to change direction, if necessary.

The 3D map APIs 265 may also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 up-to-date based on changes in map data that may be observed by sensors of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110. The route APIs 270 may include an add-planned-routes API and a get-planned-route API. The add-planned-routes API may be configured to provide information describing planned routes to the online HD map system 110 so that information describing relevant HD maps may be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data may be deleted. Accordingly, the add-planned-routes API may be configured to allow the vehicle 150 to indicate the route the vehicle 150 is planning on taking in the near future as an autonomous trip. The add-planned-route API may also be configured to align the route to the HD map, record the route and its TTL value, and determine that the HD map data for the route stored in the vehicle computing system 120 is up-to-date. The get-planned-routes API may be configured to return a list of planned routes and to provide information describing a route identified by a route identifier.

The map update API 285 may be configured to manage operations related to updating of map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and upload data to the online HD map system 110 that may result in the online HD map system 110 updating the map data stored in the HD map store 165 that is provided to other vehicles 150.

Figure 3:
FIG. 3 illustrates an example of various layers of instructions in an HD map application programming interface of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided vendors, such as NVIDIA, QUALCOMM, and INTEL. These platforms may provide functionality for use by autonomous vehicle manufacturers in the manufacture of autonomous vehicles 150. A vehicle manufacturer may use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and may allow the vehicle 150 to interact with the online HD map system 110.

As illustrated in FIG. 3, the HD map API 205 may be configured to be implemented as a library that includes a vehicle manufacturer adapter 310, a computer platform adapter 320, and a common HD map API layer 330. The common HD map API layer 330 may be configured to include generic instructions that may be used across a plurality of vehicle computer platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to include instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific autonomous vehicle 150. The online HD map system 110 may also be configured to select the vehicle manufacturer adapter 310 for the particular vehicle manufacturer and the computer platform adapter 320 the particular computer platform of that specific vehicle 150. In addition, the online HD map system 110 may be configured to send instructions of the selected vehicle manufacturer adapter 310 and the selected computer platform adapter 320 to the vehicle computing system 120 of that specific autonomous vehicle. The vehicle computing system 120 of that specific autonomous vehicle may be configured to install the received vehicle manufacturer adapter 310 and the computer platform adapter 320. The vehicle computing system 120 may also be configured to periodically verify whether the online HD map system 110 has an update to the installed vehicle manufacturer adapter 310 and the computer platform adapter 320. In addition, if a more recent update is available compared to the version installed on the vehicle 150, the vehicle computing system 120 may be configured to request and receive the latest update and to install it.

HD Map System Architecture

FIG. 4 illustrates an example system architecture of the online HD map system 110. The online HD map system 110 may be configured to include a map creation module 410, a map update module 420, a map data encoding module 430, a load balancing module 440, a map accuracy management module 450, the vehicle interface module 160, a localization module 460, and the HD map store 165. Some embodiments of online HD map system 110 may be configured to include more or fewer modules than shown in FIG. 4. Functionality indicated as being performed by a particular module may be implemented by other modules. In some embodiments, the online HD map system 110 may be configured to be a distributed system comprising a plurality of processing systems.

The map creation module 410 may be configured to create HD map data of HD maps from the sensor data collected from several vehicles 150 that are driving along various routes. The map update module 420 may be configured to update previously computed HD map data by receiving more recent information (e.g., sensor data) from vehicles 150 that recently traveled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode the HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed across different vehicles 150 in a relatively uniform manner (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy. The localization module 460 may be configured to perform actions similar to those performed by the localization module 290 of FIG. 2.

Figure 5:
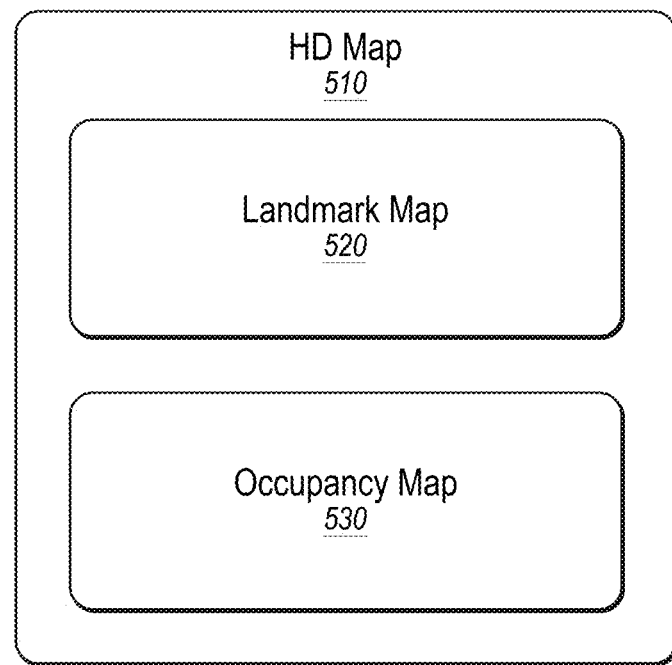
FIG. 5 illustrates example components of an HD map.

FIG. 5 illustrates example components of an HD map 510. The HD map 510 may include HD map data of maps of several geographical regions. In the present disclosure, reference to a map or an HD map, such as HD map 510, may include reference to the map data that corresponds to such map. Further, reference to information of a respective map may also include reference to the map data of that map.

In some embodiments, the HD map 510 of a geographical region may include a landmark map (LMap) 520 and an occupancy map (OMap) 530. The landmark map 520 may comprise information describing lanes including spatial location of lanes and semantic information about each lane. The spatial location of a lane may comprise the geometric location in latitude, longitude, and elevation at high prevision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In these or other embodiments, the landmark map 520 may comprise information describing stop lines, yield lines, spatial location of cross walks, safely navigable space, spatial location of speed bumps, curb, road signs comprising spatial location, type of all signage that is relevant to driving restrictions, etc. Examples of road signs described in an HD map 510 may include stop signs, traffic lights, speed limits, one-way, do-not-enter, yield (vehicle, pedestrian, animal), etc.

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore, the online HD map system 110 and the vehicle computing system 120 may use data compression techniques to be able to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 does may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 may divide a large physical area into geographical regions and may store a representation of each geographical region. Each geographical region may represent a contiguous area bounded by a geometric shape, for example, a rectangle or square. In some embodiments, the online HD map system 110 may divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing sparsely populated area with very few streets. In some embodiments, the online HD map system 110 may determine the size of a geographical region based on an estimate of an amount of information that may be used to store the various elements of the physical area relevant for the HD map.

In some embodiments, the online HD map system 110 may represent a geographic region using an object or a data record that may include various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
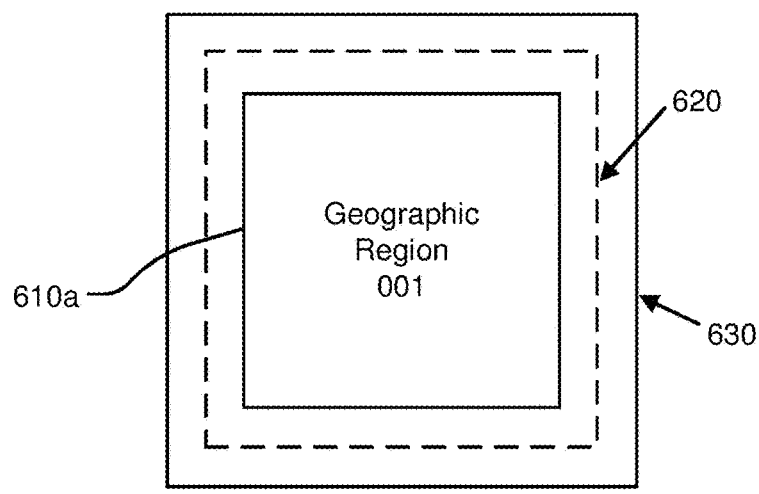
FIGS. 6A-6B illustrate example geographical regions defined in an HD map.
Figure 6B:
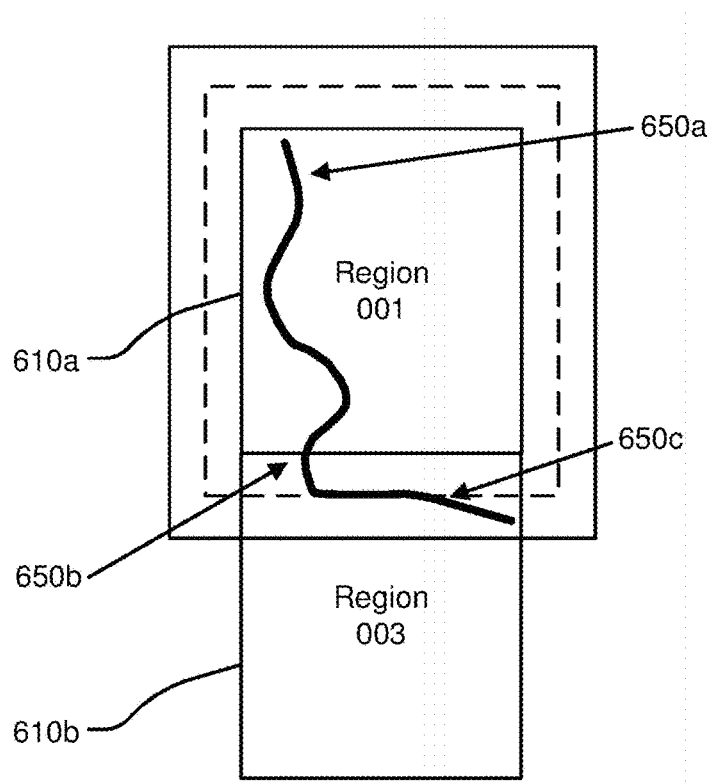

FIGS. 6A-6B illustrate example geographical regions 610a and 610b that may be defined in an HD map according to one or more embodiments. FIG. 6A illustrates a square geographical region 610a. FIG. 6B illustrates two neighboring geographical regions 610a and 610b. The online HD map system 110 may store data in a representation of a geographical region that may allow for transitions from one geographical region to another as a vehicle 150 drives across geographical region boundaries.

In some embodiments, as illustrated in FIG. 6, each geographic region may include a buffer of a predetermined width around it. The buffer may comprise redundant map data around one or more sides e of a geographic region. In these or other embodiments, the buffer may be around every side of a particular geographic region. Therefore, in some embodiments, where the geographic region may be a certain shape, the geographic region may be bounded by a buffer that may be a larger version of that shape. By way of example, FIG. 6A illustrates a boundary 620 for a buffer of approximately 50 m around the geographic region 610a and a boundary 630 for a buffer of approximately 100 m around the geographic region 610a.

In some embodiments, the vehicle computing system 120 may switch the current geographical region of the corresponding vehicle 150 from one geographical region to a neighboring geographical region when the corresponding vehicle 150 crosses a predetermined threshold distance within the buffer. For example, as shown in FIG. 6B, the corresponding vehicle 150 may start at location 650a in the geographical region 610a. The corresponding vehicle 150 may traverse along a route to reach a location 650b where it may cross the boundary of the geographical region 610 but may stay within the boundary 620 of the buffer. Accordingly, the vehicle computing system 120 of the corresponding vehicle 150 may continue to use the geographical region 610a as the current geographical region of the vehicle. Once the corresponding vehicle 150 crosses the boundary 620 of the buffer at location 650c, the vehicle computing system 120 may switch the current geographical region of the corresponding vehicle 150 to geographical region 610b from geographical region 610a. The use of a buffer may reduce or prevent rapid switching of the current geographical region of a vehicle 150 as a result of the vehicle 150 travelling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles 150 may travel. The HD map system 100 may use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 may also store information relative to lanes, for example, landmark features such as road signs and traffic lights relative to the lanes, occupancy grids relative to the lanes for obstacle detection, and navigable spaces relative to the lanes so the vehicle 150 may plan/react in emergencies when the vehicle 150 makes an unplanned move out of the lane. Accordingly, the HD map system 100 may store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and other relevant features/data relative to the lane and adjoining and connected lanes.

Figure 7:
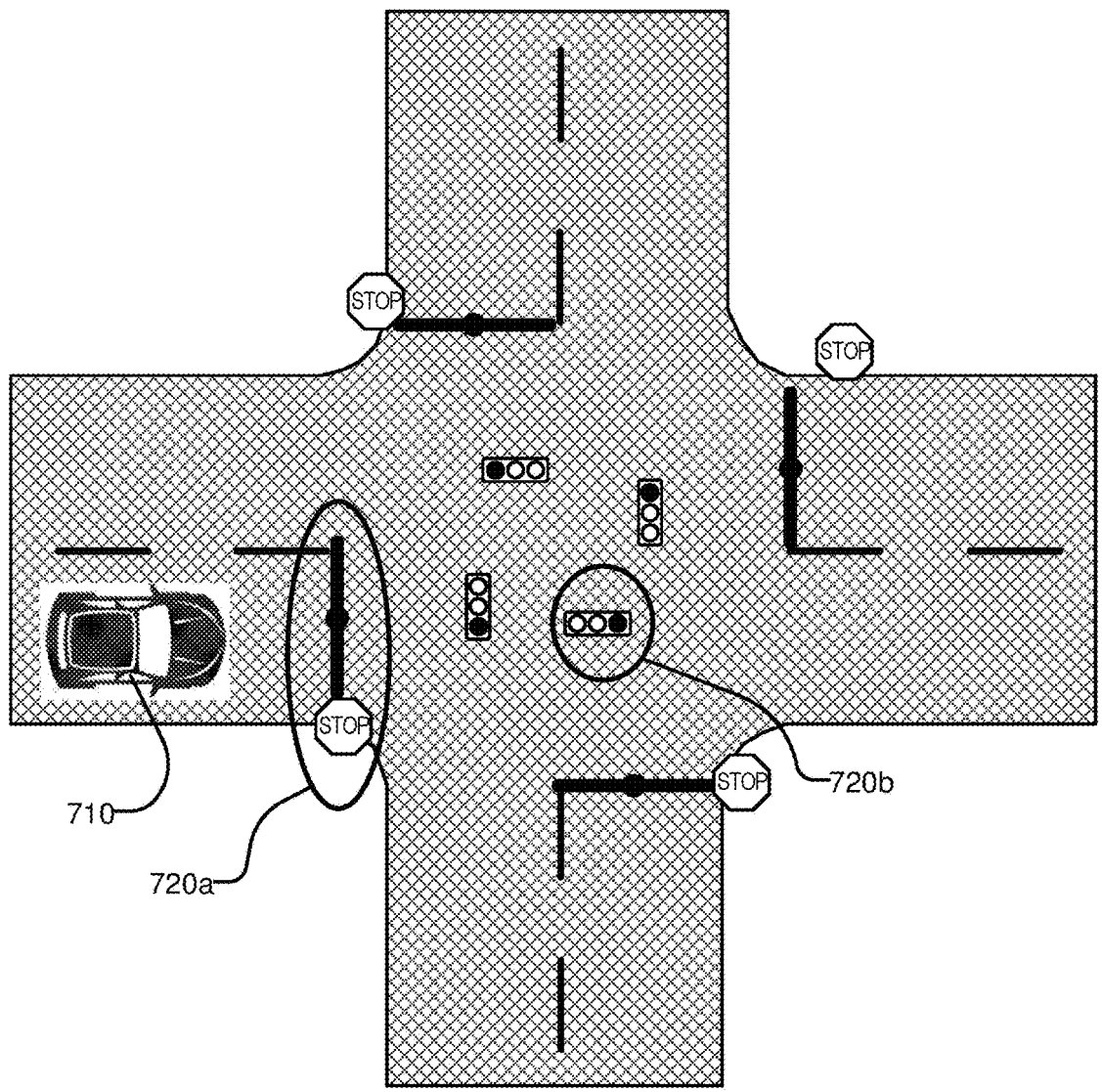
FIG. 7 illustrates example representations of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720a and 720b that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map data may represent portions of the lanes as lane elements. The lane elements may specify the boundaries of the lane and various constraints including the legal direction in which a vehicle may travel within the lane element, the speed with which the vehicle may drive within the lane element, whether the lane element may be for left turn only, or right turn only, etc. In some embodiments, the HD map data may represent a lane element as a continuous geometric portion of a single vehicle lane. The HD map system 100 may store objects or data structures that may represents lane elements that may comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations, etc., as part of the HD map data.

Examples of lane elements represented by the HD map data may include, a piece of a right lane on a freeway, a piece of a lane on a road, a left turn lane, the turn from a left turn lane into another lane, a merge lane from an on-ramp an exit lane on an off-ramp, and a driveway. The HD map data may represent a one-lane road using two lane elements, one for each direction. The HD map system 100 may represents median turn lanes that may be shared similar to a one-lane road.

Figure 8A:
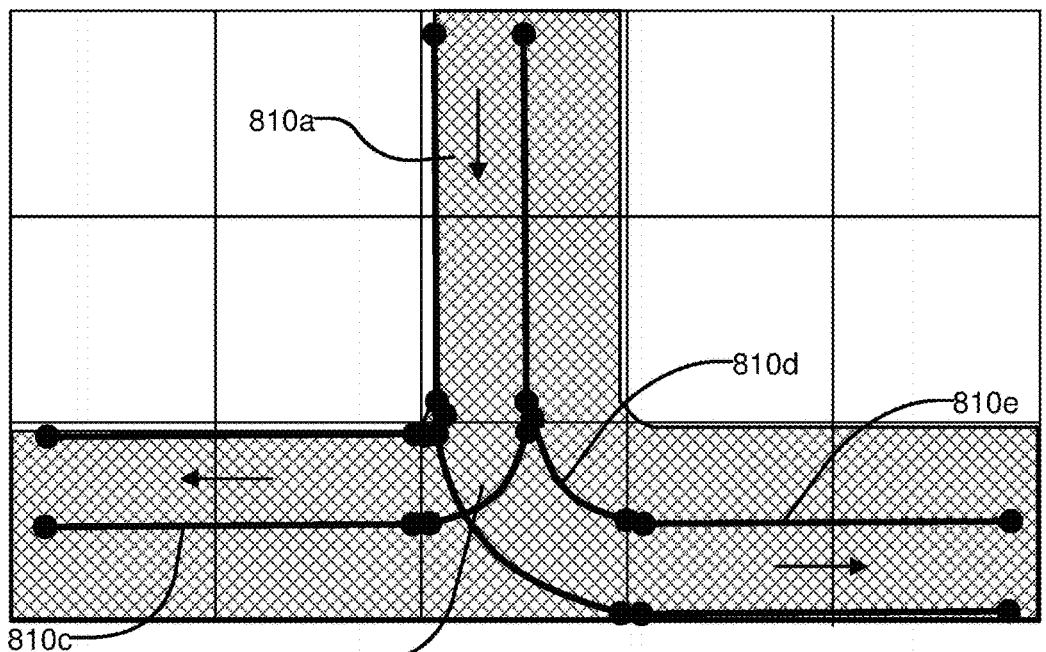
FIGS. 8A-8B illustrates example lane elements and relationships between lane elements in an HD map.
Figure 8B:
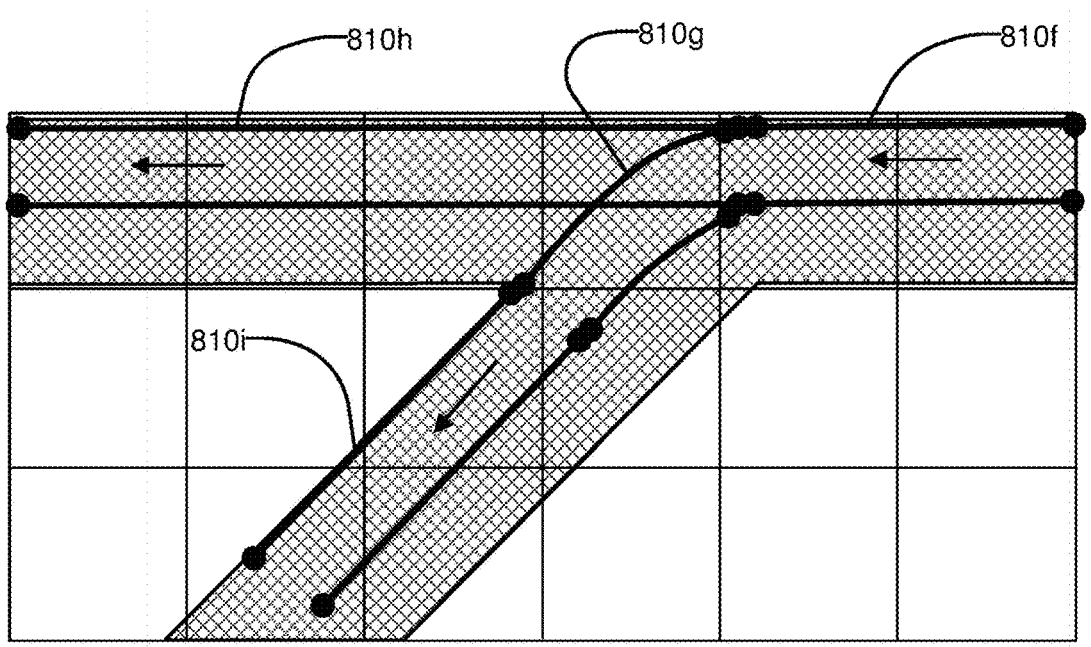

FIGS. 8A-B illustrate lane elements and relations between lane elements in an HD map. FIG. 8A illustrates an example of a T-junction in a road illustrating a lane element 810a that may be connected to lane element 810c via a turn lane 810b and is connected to lane 810e via a turn lane 810d. FIG. 8B illustrates an example of a Y-junction in a road illustrating label 810f connected to lane 810h directly and connected to lane 810i via lane 810g. The HD map system 100 may determine a route from a source location to a destination location as a sequence of connected lane elements that can be traversed to reach from the source location to the destination location.

Localization

A vehicle computing system 120 may perform localization to determine an estimate of a vehicles state (e.g., position, orientation, velocity, acceleration) relative to an HD map at a particular point in time. The estimate determined may include error. To safely utilize a vehicle state estimate, it may be important to understand how accurate the estimate is and determine a measure of confidence in the estimate.

In some embodiments, a covariance of state parameters may include an N×N matrix of the joint variability of the state parameters, which may represent the uncertainty of the parameters under a gaussian error model as a hyper-ellipsoid. Also, a confidence interval may include a range of values for a state parameter. Further, a confidence may include the estimated likelihood that the actual value of the state falls in the confidence interval.

In some embodiments, a localization process may be performed by the vehicle computing system 120 receiving various sensor inputs and then using them to estimate the state $X_i(t)$ at the time that sensor i data was acquired, each of which may have an associated covariance, such as $\Sigma_i$ for sensor i.

In some embodiments, the vehicle computing system 120 may perform a fusion process (e.g., using techniques such as Kalman filtering) to merge this state and covariance information over time so that a better state estimate can be determined. The vehicle computing system 120 may also use the fusion process to predict the state at a future time t. Such predictions may produce added uncertainty that may depend upon how far into the future the prediction is made.

The online HD map system 110 may determine, along with localization, meaningful confidence measures for estimated vehicle states (e.g., uncertainties that reflect the expected estimation accuracy). The online HD map system 110 may factor these uncertainties into a combination of map related $C_{Map}$ and localization related $C_{Localization}$ uncertainty measures, which may also be considered as static/offline and dynamic/online components, respectively:

$$C=f(C_{Map}, C_{Localization})$$

The system may determine map uncertainty $C_{Map}$ as a value inherent to the static environment as represented by the map, that relates to the presence and/or absence of constraining structures. The system may measure how well the static environment constrains a given vehicle pose in the map, assuming full observability by means of some sensor (e.g., LIDAR with sufficient range, resolution, and field of view).

Map Ambiguity Representation for Computing Localization Confidence

Ultimately the system may want to compute a level of confidence in a localization at any point in time. Recognizing that the localization is the solution that is optimizing an objective function which measures the distance between the sensor data and the map, the system may determine the likelihood that the local minima currently determined is the actual location of the vehicle within some tolerance. This determination may generally result in one of three outcomes, as illustrated in FIGS. 9A, 9B, and 9C: (1) a well constrained case that will always be within the actual location after optimization (e.g., very clear minima is same as actual), (2) a constrained case where there are other nearby local minima that could also be the actual location (e.g., clear minima but other local minima nearby), or (3) an underconstrained case, where movement in one or more directions may not change the optimization result significantly (e.g., can move in +/−x-direction, or the forward direction of the vehicle, without affecting the optimization error much), with x-direction uncertainty (e.g., most typical, tunnel, highway, overpass) and/or x,y-yaw uncertainty (e.g., flatland with no features to left or right). FIGS. 9A, 9B, and 9C may further illustrate the effect of time limited optimization results in a region of convergence which may be smaller than the mathematical basin width. In some embodiments, the convergence region may be defined as the $(x_-, x_+)$ range in dx for which the scan at dx=0 converges to the pose within $E_{def}$.

With respect to the x-direction uncertainty with respect to the vehicle coordinate system, in some embodiments, an assumption may be that the only time that the underconstrained case is occurring is when the underconstrained direction is also along the x-direction (e.g., traveling direction) of the vehicle. However, there may be relatively rare cases when this is not true, such as where the vehicle is doing a U-turn in a tunnel or bridge, but these rare cases may be highly unlikely scenarios as there may be other geometry to allow for the U-turn.

As a vehicle travels, the system may constantly update its state uncertainty in the Kalman Filter (KF). The system may typically have a gaussian uncertainty $<P_{pred}, \sigma_{pred}>$ on predicted positions that are possible with respect to the current KF state estimates. The system may also have an expectation on the maximum error for localization results, which may be a predefined localization error tolerance, $E_{def}$ (e.g., which may be targeted at 20 cm 4σ where σ is 5 cm). These error tolerance values may be customer chosen. For example, the error tolerance may be chosen to guarantee a specific accuracy for safety and contingency reasons, or for a service level agreement that might guarantee a certain accuracy at some rate (e.g., 100% confidence 99.9% of time at E=20 cm and 100% confidence 99.9999% of time at E=50 cm).

Convergence Range

In some embodiments, a convergence range may describe how large an area a localization algorithm could converge to the true location with a noisy initial guess in that area. With a given initial guess pose p as: CR(p), which is composed by a direction $R_x$ with a range $(x_-, x_+)$ in that direction: $CR(p)=(p, R_x, x_-, x_+)$.

With respect to the x-direction, $R_x$, this direction may not be the x-direction in the body frame, but may be the direction where there is the most uncertainty. This x-direction may be computed by looking at the predicted covariance. For example, the system may take the eigenvalue of the SVD decomposition as the most uncertain direction for the X,Y plane. CR(p) may encode the x-direction. One remaining issue may be that this direction may not be the same direction that has repeated structure. For example, where there is an open road with some repeated lamps in the moving direction, the most constrained direction may be along with the road and the direction vertical to the road may have the most uncertainty, in which case this assumption would fail.

With respect to the convergence likelihood L, the system may compute the likelihood that the localization result is optimal/actual within $E_{def}$. The system may precompute the distribution of local minima around an area of the map, so that the system is able to quickly look up and estimate the likelihood that converging to a localization solution is within the desired error tolerance. In some embodiments, error means the correspondence RMS error of the ICP.

In some embodiments, the system may precompute the convergence range $(x_-, x_+)$ for the direction x, at each sample location $P_{ref}$ in the map and store this info in an accessible form on the vehicle. As the system localizes to pose $P_{loc}$, the system may look up this information for the nearest sample (e.g., or nearest three samples) in the map. This may give an estimate of the convergence range $CR(P_{ref})$. The system may assume $CR(P_{loc})=CR(P_{ref})$ in the direction $R_x$. Simultaneously, the system may determine the filter state uncertainty, $\sigma_{pred}$ for the x-dimension of the vehicle and the predicted pose $P_{pred}$. The system may determine the measure of uncertainty based on a measure of integral of the normal distribution $(\mu, \sigma_{pred})$ where the mean $\mu$ is $P_{pred}-P_{loc}$ in the x-direction of $P_{ref}$, whether the system here does a projection or just directly uses the difference.

Figure 9D:
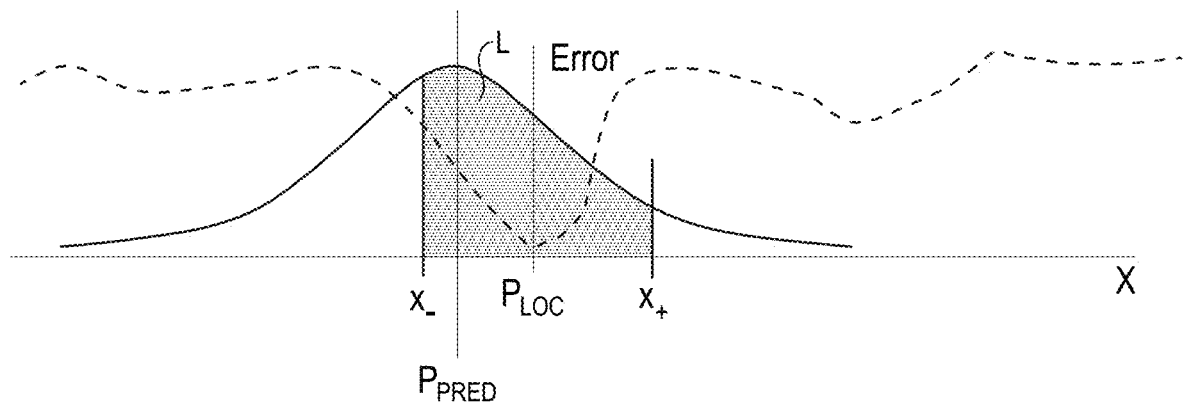

As illustrated in FIG. 9D, the likelihood of correctness, or the confidence value, may be:

$$L=GaussSum(P_{pred}, \sigma_{pred}, CR(P_{loc}))$$

Where $P_{pred}, \sigma_{pred}$ is the Kalman filter predicted pose and its corresponding covariance. $CR(P_{loc})$ is the localization pose's convergence range $(x_-, x_+)$ which may be the nearest neighbor $P_{ref}$ convergence range, as discussed in connection with computing convergence ranges. The GaussSum function may compute the area between the $x_-, x_+$ in Gaussian function with $(\mu, \sigma_{pred})$, $\mu$ being the pose difference $P_{pred}-P_{loc}$ as mentioned previously. FIG. 9D also shows the effective computation of L for a given $P_{loc}$ and $P_{pred}$: L integral of the predicted normal distribution between the range of convergence relative to dx. In this example, the likelihood that the vehicle is in the optimal location is relatively low (e.g., 25% or so) compared to the prediction uncertainty. The curve shows the RMS error of the localization method.

Figure 9E:
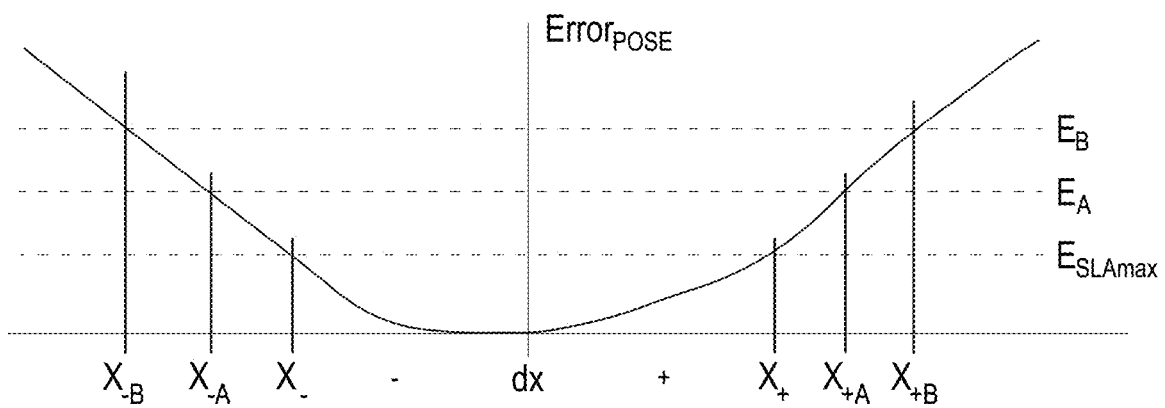

The likelihood of convergence may be dependent on the convergence threshold: $E_{def}$(e.g., which may be 20 cm). The system may take this analysis a step further and think about convergence ranges over a continuum of convergence thresholds. FIG. 9E illustrates results of a simulation of computing the converged error for dx (where 0 is ground truth location). The system may compute ranges for a number of convergence tolerance thresholds, $E_A$ and $E_B$. For example, the system may set tolerances for checking if a vehicle is in a dangerous situation, for example, by defining safety limits in terms of confidence, with $E_A=0.5$ m, and with $E_B=1.0$ m. If $L(E_A)$ drops below a certain limit (e.g., 0.9), the system may go into bootstrap mode (e.g., a larger search to get back on track). Further, if $L(E_B)$ drops below a certain limit (e.g., 0.9), the system may go into safety mode where the vehicle determines a safe place to stop.

Figure 9F:
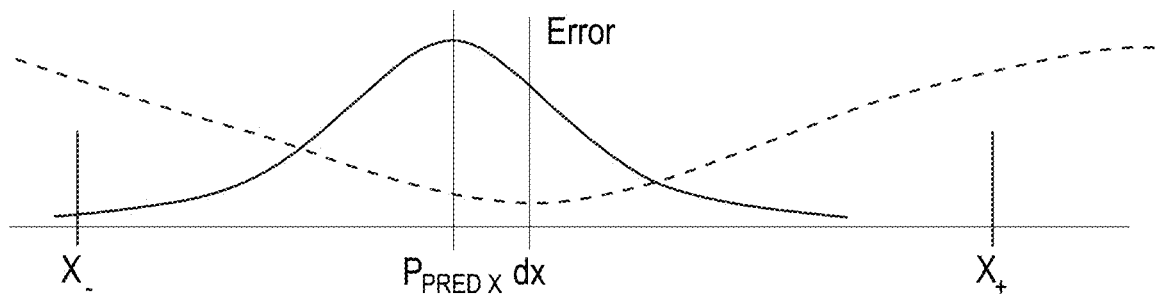

In some embodiments, the system may uses localization solutions where L $(E_{def})$ is generally 1.0, and $L(E_A)$ is almost always 1.0 (within some tolerance with respect to the length of tails of the Gaussian distribution that can be calculated, such as 3σ). An ideal situation may be illustrated in FIG. 9F, where the entire distribution (e.g., within 3σ) for the prediction is within the convergence range. In some embodiments, $L=(E_{def})=1.0$ does not necessarily mean the calculation is correct. The lookup for $CR(P_{loc})$ may be an approximation, and the computation of the $(P_{pred}, \sigma_{pred})$ filter may be an estimate as well.

Computing Convergence Ranges

In some embodiments, the system may compute convergence ranges using data samples with known pose $P_{actual}$ and perturbing their poses in the x-direction by dx then running the localization algorithm (which may be applicable to any localization algorithm). The localization algorithm may produce $P_{loc}$, and then error may be calculated as:

$$E_{pos}(dx)=|P_{actual}-P_{loc}(dx)|$$

This error may be different from the ICP error disclosed above. For example, this error may be error in the pose estimate, which may become known during convergence tests. The system may then compute $CR(p)(E_{def})$ by finding the points where $E_{pose}(dx)>=E_{def}$ and similarly for $E_A$, $E_B$ etc. The system may store this data with the map location <p, $R_x$, $x_-$, $x_+$> for each sample in that map. The system may index this data spatially for fast lookup at runtime. The system may use any of the following approaches to estimating the convergence range at the real time localization result: $CR(P_{loc})$:

1. Use the convergence range D from the nearest neighbor $P_{ref}$ to $P_{loc}$.
2. Use the two nearest neighbors to $P_{loc}$, then take a linear combination of $CR(p_1)$, $CR(p_2)$ relative to $P_{loc}$.
3. Use three nearest neighbors and use barycentric interpolation of $CR(p_i)$, $CR(P_2)$, $CR(P_3)$ relative to $P_{loc}$.

Then the system may use $CR(P_{loc})$ to estimate L.

There may be cases where the y and z directions are well constrained, but some embodiments do not converge in those directions.

Map Ambiguity Effect on Measurement Covariance

The three cases described above, namely, constrained, ambiguous and underconstrained may have an effect on measurement uncertainty as used in the Kalman Filter. For example, these three cases may be different with respect to this measurement uncertainty along the x direction (e.g., assuming the other uncertainties are usable from the covariance computed by the localization algorithm), as follows:

1. constrained:
   a. if the convergence range $[X_-, X_+]$ is contained within $<P_{pred}-2\sigma_{pred}, P_{pred}+2\sigma_{pred}>$ then the covariance computed by ICP (or any other localization algorithm) is likely accurate.
   b. if not contained, then the covariance from ICP (or any other localization algorithm) is optimistic.
2. ambiguous: the covariance computed by ICP (or any other localization algorithm) is optimistic.
3. underconstrained: the covariance computed by ICP (or any other localization algorithm) is likely accurate as it will account for the uncertainty in x.

These cases may be boiled down to the following two cases:
1. constrained: covariance from ICP is acceptable
2. ambiguous: the system may consider the effect of other local minima within $<P_{pred}, \sigma_{pred}>$.

Figure 9G:
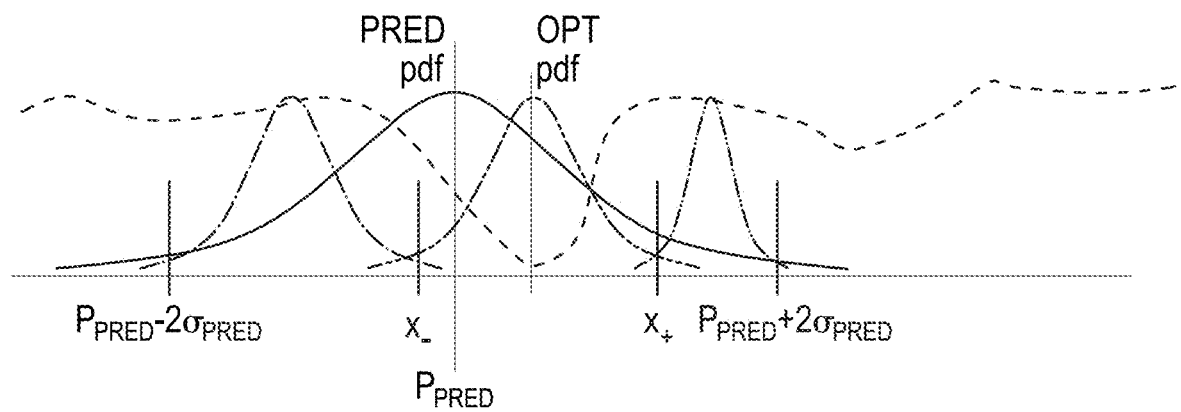

With respect to the ambiguous case, the system may assume:

1. $\sigma_x^2$ ICP: the covariance of x-direction computed from ICP
2. $X_i$: the positions of the N local minima
3. $[X_-, X_+]$: the convergence ranges of the local minima
4. $<P_{pred}, \sigma_{pred}>$: the current prediction uncertainty The covariance of the combined distribution may be approximated as the covariance of a mixture of Gaussians, as illustrated in FIG. 9G. The system may define:

1. $<X_{OPT}, \sigma_{OPT}>$: $X_{OPT}$ the returned result, and approximate $\sigma_{OPT}=(X_{+OPT}-X_{-OPT})/4$
2. $P_{OPT}$: as above, the integral of the Gaussian between $[X_{-OPT}, X_{+OPT}]$ Then the system may approximate the ambiguities to the left and right of $X_{OPT}$. The system may approximate them as Gaussian distributions:

$<X_{LEFT}, \sigma_{LEFT}>$ and $<X_{RIGHT}, \sigma_{RIGHT}>$

For example, for each, the system may approximate using simply the bounds of the convergence range $[X_{-OPT}, X_{+OPT}]$ and the $[X_{PRED}-2\sigma_{PRED}, X_{PRED}+2\sigma_{PRED}]$:

$[X_{-LEFT}/X_{+LEFT}] = [X_{PRED} - 2\sigma_{PRED}, X_{-OPT}]$ $\mu_{LEFT} = (X_{+LEFT} - X_{-LEFT})/2$ $\sigma_{LEFT} = (X_{+LEFT} - X_{-LEFT})/4$ $P_{LEFT} = \text{GaussCum}(<X_{PRED}, \sigma_{PRED}>, X_{+LEFT}) - \text{GaussCum}(<X_{PRED}, \sigma_{PRED}>, X_{-LEFT})$ and $[X_{-RIGHT}/X_{+RIGHT}] = [X_{+OPT}, X_{PRED} + 2\sigma_{PRED}]$ $\mu_{RIGHT} = (X_{+RIGHT} - X_{-RIGHT})/2$ $\sigma_{RIGHT} = (X_{+RIGHT} - X_{-RIGHT})/4$ $P_{RIGHT} = \text{GaussCum}(<X_{PRED}, \sigma_{PRED}>, X_{+RIGHT}) - \text{GaussCum}(<X_{PRED}, \sigma_{PRED}>, X_{-RIGHT})$ Given this as an approximation, the system may compute the gaussian approximation $<\mu_{MIX}, \sigma_{MIX}>$ of the Gaussian mixture as:

$$\mu_{MIX} = \sum_i P_i \mu_i$$

$$\sigma^2_{MIX} = 1 \Big/ \sum_i P_i(\sigma_i + (\mu_i - \mu_{MIX})^2)$$

where $i \in \{\text{OPT, RIGHT, LEFT}\}$ $\sigma_{MIX}$ may then be used as the uncertainty in the s-direction.

Occlusion Handling in Localization

In some embodiments, in order to account for occlusion in live localization, the system may store a quantity that approximates the visibility in the constrainedness map. The system may use this quantity to incorporate the effect of occlusion.

In some embodiments, the system may use a matrix to store the ray tracing distance to the map, that is similar to a 360 range image (or heatmap) representation of the map, but at a lower resolution. This map range image may be stored in the constrainedness map. In live localization, the system may compare this map range image to the current scan to get an approximate occlusion ratio of the current view. The system may use the occlusion ratio to adjust the constrainedness at runtime. For example, an occlusion may be visible in a range image, such as where a significant portion of the field of view is blocked by a nearby truck.

Figure 10:
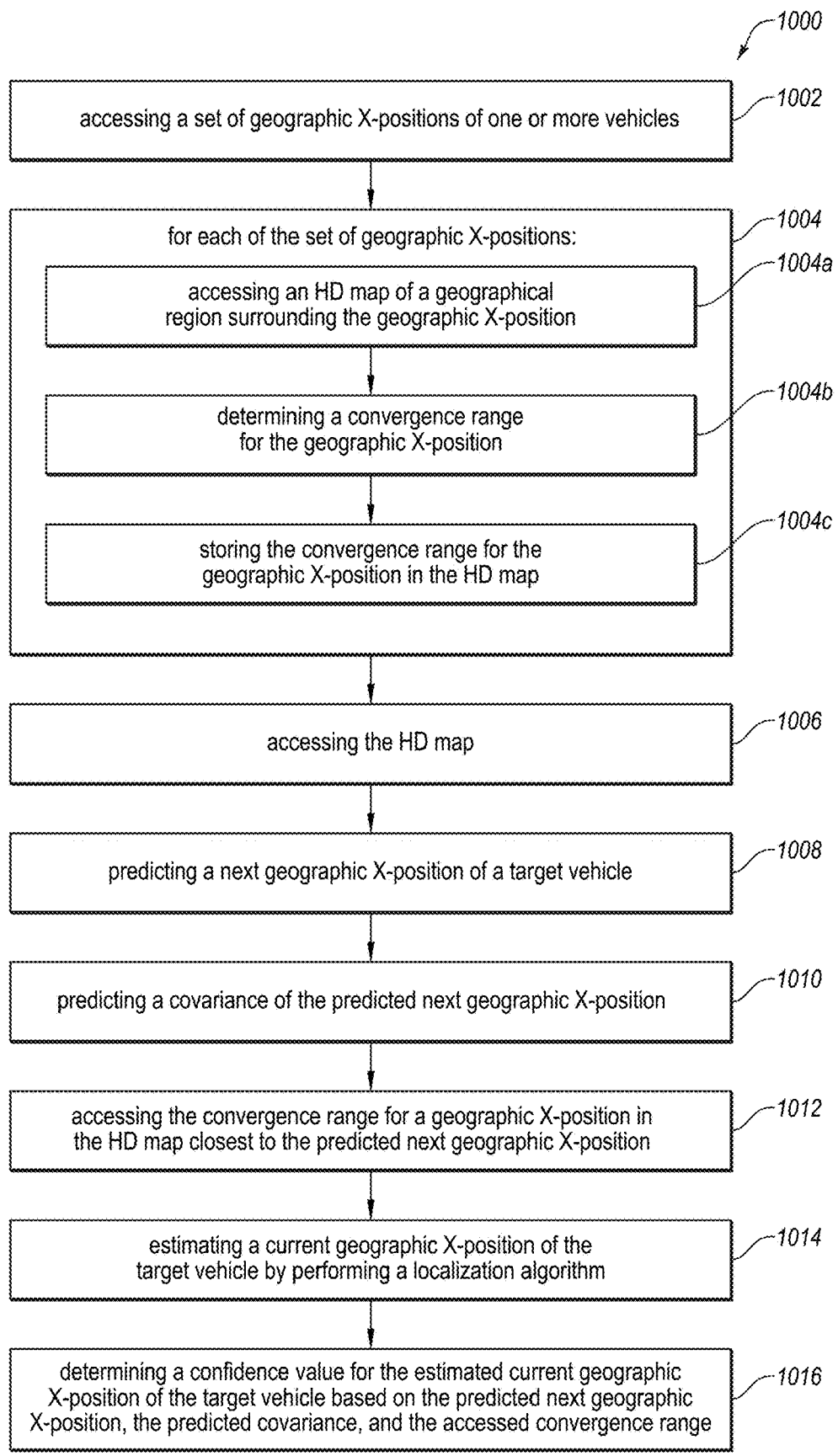
FIG. 10 illustrates a flowchart of an example method of determining localization confidence of vehicles based on convergence ranges.

FIG. 10 illustrates a flowchart of an example method 1000 of determining localization confidence of vehicles based on convergence ranges. The method 1000 may be performed by any suitable system, apparatus, or device. For example, one or more elements of the HD map system 100 of FIG. 1 may be configured to perform one or more of the operations of the method 1000. Additionally or alternatively, the computer system 1100 of FIG. 11 may be configured to perform one or more of the operations associated with the method 1000. Although illustrated with discrete blocks, the actions and operations associated with one or more of the blocks of the method 1000 may be divided into additional blocks, combined into fewer blocks, or eliminated, depending on the particular implementation.

The method 1000 may include, at action 1002, accessing a set of geographic X-positions of one or more vehicles. For example, the localization module 460 of the online HD map system 110 may access, at action 1002, a set of geographic X-positions of one or more vehicles 150a-150d.

The method 1000 may include, at action 1004, for each of the set of geographic X-positions, at action 1004a, accessing an HD map of a geographical region surrounding the geographic X-position, at action 1004b, determining a convergence range for the geographic X-position, and at action 1004c, storing the convergence range for the geographic X-position in the HD map. For example, the localization module 460 of the online HD map system 110 may, at action 1004, for each of the set of geographic X-positions, access, at action 1004a, an HD map of a geographical region surrounding the geographic X-position, determine, at action 1004b, a convergence range (e.g., a convergence range ($x_-$, $x_+$)) for the geographic X-position, and store, at action 1004c, the convergence range for the geographic X-position in the HD map.

The method 1000 may include, at action 1006, accessing the HD map. For example, the localization module 290 of the vehicle computing system 120 of the vehicle 150 may access, at action 1006, the HD map.

The method 1000 may include, at action 1008, predicting a next geographic X-position of a target vehicle. For example, the localization module 290 may predict, at action 1008, a next geographic X-position of the vehicle 150a (e.g., the X-position of the predicted pose $P_{pred}$).

The method 1000 may include, at action 1010, predicting a covariance of the predicted next geographic X-position. For example, the localization module 290 may predict, at action 1010, a covariance of the predicted next geographic X-position of the vehicle 150a (e.g., the covariance $\sigma_{pred}$ of the predicted pose $P_{pred}$)

The method 1000 may include, at action 1012, accessing the convergence range for the geographic X-position in the HD map closest to the predicted next geographic X-position. For example, the localization module 290 may access, at action 1012, the convergence range (e.g., a convergence range ($x_-$, $x_+$)) for the geographic X-position in the HD map closest to the predicted next geographic X-position of the vehicle 150a (e.g., the X-position of the predicted pose $P_{pred}$).

The method 1000 may include, at action 1014, estimating a current geographic X-position of the target vehicle by performing a localization algorithm. For example, the localization module 290 may estimate, at action 1014, a current geographic X-position of the vehicle 150a (e.g., the x-position of the estimated pose $P_{loc}$).

The method 1000 may include, at action 1016, determining a confidence value for the estimated current geographic X-position of the target vehicle based on the predicted next geographic X-position, the predicted covariance, and the accessed convergence range. In some embodiments, the action 1016 may include calculating an integral area between minimum and maximum values of the accessed convergence range of a Gaussian function of the predicted next geographic X-position. For example, the localization module 290 may determine, at action 1016, a confidence value for the estimated current geographic X-position of the vehicle 150a based on the predicted next geographic X-position, the predicted covariance, and the accessed convergence range (e.g., according to the formula L=GaussSum($P_{pred}$, $\sigma_{pred}$, CR($P_{loc}$))).

In some embodiments, the method 1000 may further include employing the confidence value for the estimated current geographic X-position to update a state uncertainty value in a Kalman Filter (KF). Further, in some embodiments, the confidence value for the estimated current geographic X-position may be constrained due to being at or above a threshold, or may be ambiguous due to being below a threshold.

Subsequent to the action 1016, the method 1000 may employ the confidence value for a localization in gathering data to update the HD map store 165 for the geographical region, and/or in navigating a vehicle, such as the vehicle 150 or another non-autonomous vehicle, through the geographical region. Further, the method 1000 may be employed repeatedly as the vehicle 150 navigates along a road. For example, the method 1000 may be employed when the vehicle 150 (or another non-autonomous vehicle) starts driving, and then may be employed repeatedly during the navigation of the vehicle 150 (or another non-autonomous vehicle). The vehicle 150 may navigate by sending control signals to controls of the vehicle 150. The method 1000 may be employed by the vehicle computing system 120 of the vehicle 150 to assign a confidence value to an estimated current geographic X-position of the vehicle 150, which may indicate a level of confidence that the vehicle 150 is actually located at the estimated current geographic X-position.

Computer System Architecture

Figure 11:
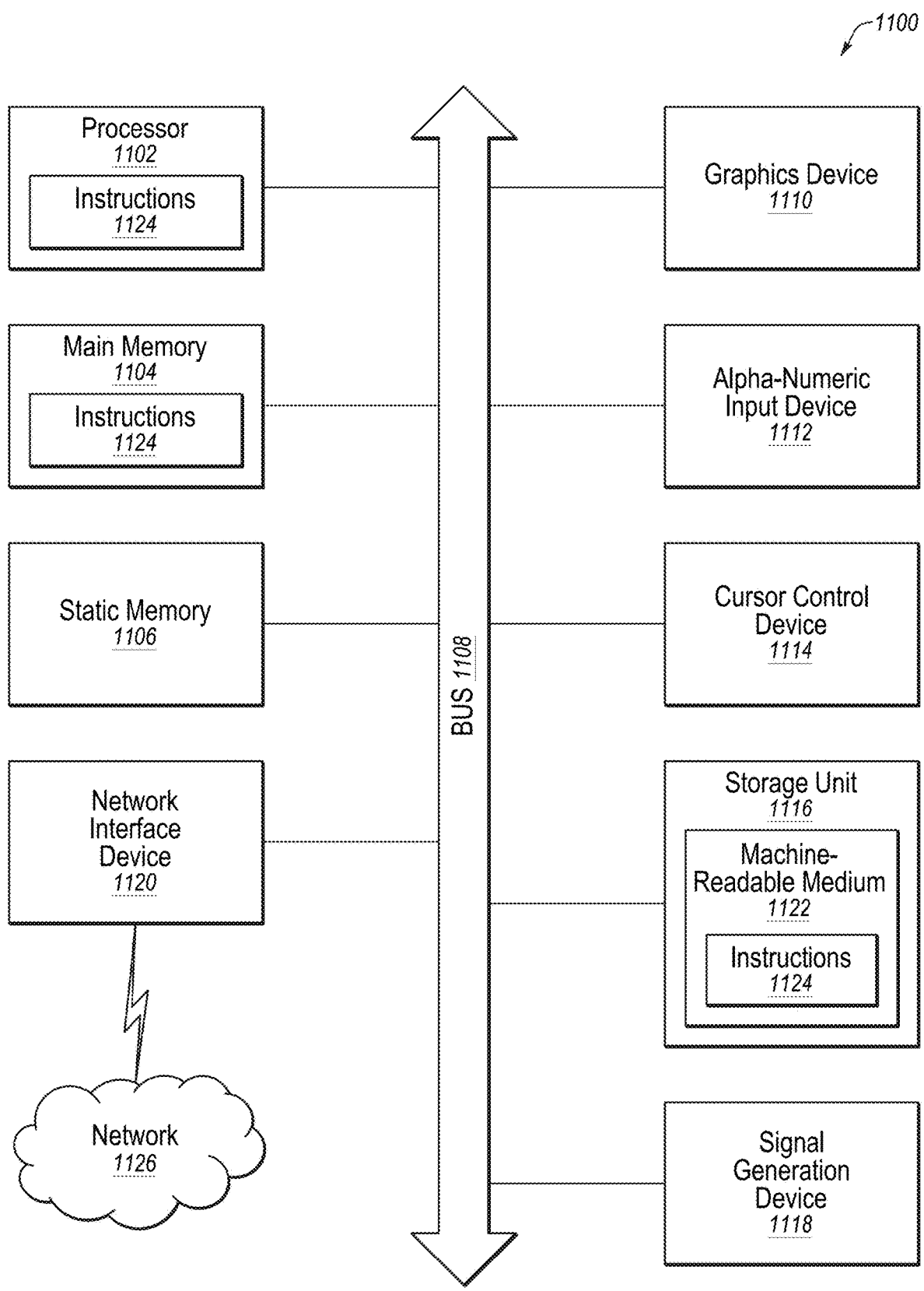
FIG. 11 illustrates an example embodiment of a computing machine that can read instructions from a machine-readable medium and execute the instructions in a processor or controller.

FIG. 11 is a block diagram illustrating components of an example computer system able to read instructions from a machine-readable medium and execute them in a processor (or controller). Specifically, FIG. 11 shows a diagrammatic representation of a machine in the example form of a computer system 1100 within which instructions 1124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 may be part of or may be any applicable system described in the present disclosure. For example, the online HD map system 110 and/or the vehicle computing systems 120 described above may comprise the computer system 1100 or one or more portions of the computer system 1100. Further, different implementations of the computer system 1100 may include more or fewer components than those described herein. For example, a particular computer system 1100 may not include one or more of the elements described herein and/or may include one or more elements that are not explicitly discussed.

The example computer system 1100 includes a processor 1102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1104, and a static memory 1106, which are configured to communicate with each other via a bus 1108. The computer system 1100 may further include graphics display unit 1110 (e.g., a plasma display panel (PDP), a liquid crystal display (LCD), a projector, or a cathode ray tube (CRT)). The computer system 1100 may also include alphanumeric input device 1112 (e.g., a keyboard), a cursor control device 1114 (e.g., a mouse, a trackball, a joystick, a motion sensor, or other pointing instrument), a storage unit 1116, a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 (e.g., software) may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 (e.g., software) may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1124) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A computer-implemented method, comprising:
   accessing a set of geographic X-positions associated with one or more vehicles, wherein each geographic X-position of the set of geographic X-positions is associated with a respective vehicle of the one or more vehicles;
   for each respective geographic X-position of the set of geographic X-positions:
      accessing a high definition (HD) map of a geographical region surrounding the respective geographic X-position, the HD map comprising a three-dimensional (3D) representation of the geographical region, and determining a convergence range for the respective geographic X-position;

predicting a geographic X-position of a target vehicle and a covariance of the predicted geographic X-position, the predicted geographic X-position being separate from each respective geographic X-position of the set of geographic X-positions;

estimating a geographic X-position of the target vehicle by performing a localization algorithm, the estimated geographic X-position being separate from the predicted geographic X-position and being separate from each respective geographic X-position of the set of geographic X-positions;

determining a confidence value for the estimated geographic X-position of the target vehicle based on the predicted geographic X-position, the predicted covariance, and a particular convergence range, the particular convergence range being associated with a particular geographic X-position of the set of geographic X-positions that is closest to the predicted geographic X-position relative to each respective geographic X-position of the set of geographic X-positions; and causing performance of one or more driving operations by the target vehicle based on the confidence value.

2. The computer-implemented method of claim 1, wherein the confidence value for the estimated geographic X-position of the target vehicle indicates a level of confidence that the target vehicle is actually located at the estimated geographic X-position.

3. The computer-implemented method of claim 1, wherein the determining of the confidence value for the estimated geographic X-position of the target vehicle comprises calculating an integral area between minimum and maximum values of the particular convergence range of a Gaussian function of the predicted geographic X-position.

4. The computer-implemented method of claim 1, further comprising employing the particular convergence range along with a predicted uncertainty distribution for the estimated geographic X-position to compute a new estimate of the confidence value for the estimated geographic X-position that is used to update a Kalman Filter (KF).

5. The computer-implemented method of claim 1, wherein the particular convergence range is specified relative to a convergence error with respect to each respect geographic X-position of the set of geographic X-positions.

6. The computer-implemented method of claim 1, wherein multiple convergence ranges are stored in the HD map for each respective geographic X-position of the set of geographic X-positions, with each of the multiple convergence ranges being relative to a specific convergence error tolerance, and with each specific convergence error tolerance configured to be used to compute confidence of a localization result relative to the specific convergence error tolerance.

7. One or more non-transitory computer readable storage media storing instructions that, in response to being executed by one or more processors, cause a computer system to perform operations, the operations comprising:

accessing a set of geographic X-positions associated with one or more vehicles wherein each geographic X-position of the set of geographic X-positions is associated with a respective vehicle of the one or more vehicles;

for each respective geographic X-position of the set of geographic X-positions:

accessing a high definition (HD) map of a geographical region surrounding the respective geographic X-position, the HD map comprising a three-dimensional (3D) representation of the geographical region, and determining a convergence range for the respective geographic X-position;

predicting a geographic X-position of a target vehicle and a covariance of the predicted geographic X-position, the predicted geographic X-position being separate from each respective geographic X-position of the set of geographic X-positions;

estimating a geographic X-position of the target vehicle by performing a localization algorithm, the estimated geographic X-position being separate from the predicted geographic X-position and being separate from each respective geographic X-position of the set of geographic X-positions;

determining a confidence value for the estimated geographic X-position of the target vehicle based on the predicted geographic X-position, the predicted covariance, and a particular convergence range, the particular convergence range being associated with a particular geographic X-position of the set of geographic X-positions that is closest to the predicted geographic X-position relative to each respective geographic X-position of the set of geographic X-positions; and causing performance of one or more driving operations by the target vehicle based on the confidence value.

8. The one or more non-transitory computer-readable storage media of claim 7, wherein the confidence value for the estimated geographic X-position of the target vehicle indicates a level of confidence that the target vehicle is actually located at the estimated geographic X-position.

9. The one or more non-transitory computer-readable storage media of claim 7, wherein the determining of the confidence value for the estimated geographic X-position of the target vehicle comprises calculating an integral area between minimum and maximum values of the particular convergence range of a Gaussian function of the predicted geographic X-position.

10. The one or more non-transitory computer-readable storage media of claim 7, wherein the operations further comprise employing the particular convergence range along with a predicted uncertainty distribution for the estimated geographic X-position to compute a new estimate of the confidence value for the estimated geographic X-position that is used to update a Kalman Filter (KF).

11. The one or more non-transitory computer-readable storage media of claim 7, wherein the particular convergence range is specified relative to a convergence error with respect to each respective geographic X-position of the set of geographic X-positions.

12. The one or more non-transitory computer-readable storage media of claim 7, wherein multiple convergence ranges are stored in the HD map for each respective geographic X-position of the set of geographic X-positions, with each of the multiple convergence ranges being relative to a specific convergence error tolerance, and with each specific convergence error tolerance configured to be used to compute confidence of a localization result relative to the specific convergence error tolerance.

13. A computer system comprising:
one or more processors; and
one or more non-transitory computer readable media storing instructions that in response to being executed by the one or more processors, cause the computer system to perform operations, the operations comprising:

accessing a set of geographic X-positions associated with one or more vehicles, wherein each geographic X-position of the set of geographic X-positions is associated with a respective vehicle of the one or more vehicles;

for each respective geographic X-position of the set of geographic X-positions:
- accessing a high definition (HD) map of a geographical region surrounding the respective geographic X-position, the HD map comprising a three-dimensional (3D) representation of the geographical region, and
- determining a convergence range for the respective geographic X-position;

predicting a geographic X-position of a target vehicle and a covariance of the predicted geographic X-position, the predicted geographic X-position being separate from each respective geographic X-position of the set of geographic X-positions;

estimating a geographic X-position of the target vehicle by performing a localization algorithm, the estimated geographic X-position being separate from the predicted geographic X-position and being separate from each respective geographic X-position of the set of geographic X-positions;

determining a confidence value for the estimated geographic X-position of the target vehicle based on the predicted geographic X-position, the predicted covariance, and a particular convergence range, the particular convergence range being associated with a particular geographic X-position of the set of geographic X-positions that is closest to the predicted geographic X-position relative to each respective geographic X-position of the set of geographic X-positions; and causing performance of one or more driving operations by the target vehicle based on the confidence value.

14. The computer system of claim 13, wherein the confidence value for the estimated geographic X-position of the target vehicle indicates a level of confidence that the target vehicle is actually located at the estimated geographic X-position.

15. The computer system of claim 13, wherein the determining of the confidence value for the estimated geographic X-position of the target vehicle comprises calculating an integral area between minimum and maximum values of the particular convergence range of a Gaussian function of the predicted geographic X-position.

16. The computer system of claim 13, wherein the operations further comprise employing the particular convergence range along with a predicted uncertainty distribution for the estimated geographic X-position to compute a new estimate of the confidence value for the estimated geographic X-position that is used to update a Kalman Filter (KF).

17. The computer system of claim 13, wherein the particular convergence range is specified relative to a convergence error with respect to each respective geographic X-position of the set of geographic X-positions.

18. The computer system of claim 13, wherein multiple convergence ranges are stored in the HD map for each respective geographic X-position, with each of the multiple convergence ranges being relative to a specific convergence error tolerance, and with each specific convergence error tolerance configured to be used to compute confidence of a localization result relative to the specific convergence error tolerance.

* * * * *